(12) United States Patent
Chen et al.

(10) Patent No.: US 9,154,193 B2
(45) Date of Patent: Oct. 6, 2015

(54) SYSTEM AND METHOD FOR IMPLEMENTING POWER DISTRIBUTION

(75) Inventors: Wei-Peng Chen, Fremont, CA (US);
Chenxi Zhu, Gaithersburg, MD (US);
Takao Naito, Tokyo (JP)

(73) Assignee: Fujitsu Limited, Kawasaki-shi (JP)

( * ) Notice: Subject to any disclaimer, the term of this patent is extended or adjusted under 35 U.S.C. 154(b) by 1188 days.

(21) Appl. No.: 12/909,151

(22) Filed: Oct. 21, 2010

(65) Prior Publication Data
US 2011/0223960 A1 Sep. 15, 2011

Related U.S. Application Data

(60) Provisional application No. 61/312,415, filed on Mar. 10, 2010.

(51) Int. Cl.
*H04B 7/00* (2006.01)
*H04B 7/14* (2006.01)
(Continued)

(52) U.S. Cl.
CPC .............. *H04B 7/022* (2013.01); *H04B 7/0615* (2013.01); *H04B 7/0617* (2013.01); *H04W 52/24* (2013.01);
(Continued)

(58) Field of Classification Search
CPC ........ H04B 7/022; H04B 7/04; H04B 7/0426; H04B 7/0465; H04B 7/0486; H04W 52/42; H04W 52/241; H04W 52/242; H04W 52/243; H04W 52/244; H04W 52/30; H04W 52/346; H04W 24/02; H04W 88/085

USPC ................... 455/522, 115.1, 127.2, 16, 13.4; 370/315, 318, 328
See application file for complete search history.

(56) References Cited

U.S. PATENT DOCUMENTS 4,916,460 A 4/1990 Powell
5,371,734 A * 12/1994 Fischer .......................... 370/311
(Continued)

FOREIGN PATENT DOCUMENTS

CN 1883217 A 12/2003
CN 1926782 3/2007
(Continued)

OTHER PUBLICATIONS

Chen, U.S. Appl. No. 13/020,640, U.S. Patent Office Summary, Apr. 22, 2013.
(Continued)

*Primary Examiner* — Duc M Nguyen
(74) *Attorney, Agent, or Firm* — Baker Botts L.L.P.

(57) ABSTRACT

A method for adjusting power distribution that includes establishing a connection between a base station and a plurality of remote transceivers. The method also includes establishing a plurality of wireless connections with a plurality of endpoints via one or more of the plurality of remote transceivers. The method further includes receiving a signal quality indication from each of the plurality of remote transceivers for any endpoint for which the remote transceiver is able to receive a wireless communication. The method additionally includes determining a power distribution for the plurality of remote transceivers based on the received signal quality indication from each of the remote transceivers. The method also includes transmitting a control signal to the plurality of remote transceivers. The control signal comprises the power distribution and is indicative of the amount of power each remote transceiver is to use for each endpoint when transmitting wireless communications.

18 Claims, 3 Drawing Sheets

(51) Int. Cl.
  *H04B 7/02* (2006.01)
  *H04B 7/06* (2006.01)
  *H04W 52/24* (2009.01)
  *H04W 52/26* (2009.01)
  *H04W 52/40* (2009.01)
  *H04W 88/08* (2009.01)

(52) U.S. Cl.
  CPC .......... *H04W 52/241* (2013.01); *H04W 52/267* (2013.01); *H04W 52/40* (2013.01); *H04W 88/085* (2013.01); *Y02B 60/50* (2013.01)

(56) References Cited

U.S. PATENT DOCUMENTS

| | | | |
|---|---|---|---|
| 5,479,400 A * | 12/1995 | Dilworth et al. | 370/331 |
| 5,566,209 A * | 10/1996 | Forssen et al. | 375/262 |
| 5,867,491 A | 2/1999 | Derango et al. | |
| 5,953,325 A | 9/1999 | Willars | |
| 6,070,071 A * | 5/2000 | Chavez et al. | 455/422.1 |
| 6,341,214 B2 | 1/2002 | Uesugi | |
| 6,801,767 B1 * | 10/2004 | Schwartz et al. | 455/426.2 |
| 7,020,436 B2 * | 3/2006 | Schmutz | 455/9 |
| 7,062,224 B2 * | 6/2006 | Baker et al. | 455/9 |
| 7,313,113 B1 | 12/2007 | Hills | |
| 7,519,323 B2 * | 4/2009 | Mohebbi | 455/11.1 |
| 7,574,230 B1 * | 8/2009 | Oh et al. | 455/522 |
| 7,639,984 B2 * | 12/2009 | Uwano et al. | 455/63.1 |
| 8,078,100 B2 * | 12/2011 | Proctor et al. | 455/11.1 |
| 8,174,428 B2 | 5/2012 | Wegener | |
| 8,175,004 B2 * | 5/2012 | Chang et al. | 370/254 |
| 8,213,401 B2 | 7/2012 | Fischer et al. | |
| 8,428,653 B2 | 4/2013 | Li et al. | |
| 8,670,497 B2 * | 3/2014 | Grant et al. | 375/267 |
| 8,761,824 B2 * | 6/2014 | Palanki et al. | 455/522 |
| 8,774,019 B2 * | 7/2014 | Ma et al. | 370/252 |
| 8,792,933 B2 | 7/2014 | Chen | |
| 2003/0043732 A1 * | 3/2003 | Walton et al. | 370/208 |
| 2003/0119501 A1 | 6/2003 | Kim | |
| 2003/0123401 A1 * | 7/2003 | Dean | 370/318 |
| 2003/0220075 A1 * | 11/2003 | Baker et al. | 455/17 |
| 2004/0228283 A1 * | 11/2004 | Naguib et al. | 370/252 |
| 2005/0105534 A1 | 5/2005 | Osterling | |
| 2005/0157675 A1 | 7/2005 | Feder et al. | |
| 2006/0116155 A1 * | 6/2006 | Medvedev et al. | 455/522 |
| 2006/0195883 A1 * | 8/2006 | Proctor et al. | 725/127 |
| 2006/0209752 A1 | 9/2006 | Wijngaarden et al. | |
| 2006/0217158 A1 * | 9/2006 | Uwano et al. | 455/562.1 |
| 2007/0019679 A1 | 1/2007 | Scheck | |
| 2007/0041464 A1 | 2/2007 | Kim et al. | |
| 2007/0097945 A1 * | 5/2007 | Wang et al. | 370/349 |
| 2007/0155314 A1 * | 7/2007 | Mohebbi | 455/11.1 |
| 2007/0195907 A1 * | 8/2007 | Wang et al. | 375/267 |
| 2008/0102872 A1 | 5/2008 | Liu | |
| 2008/0159217 A1 * | 7/2008 | Chang et al. | 370/329 |
| 2008/0293446 A1 | 11/2008 | Rofougaran | |
| 2009/0061939 A1 * | 3/2009 | Andersson et al. | 455/562.1 |
| 2009/0135966 A1 | 5/2009 | Fischer et al. | |
| 2009/0170437 A1 | 7/2009 | Bhattad et al. | |
| 2009/0202020 A1 * | 8/2009 | Hafeez | 375/299 |
| 2009/0252108 A1 | 10/2009 | Watanabe | |
| 2009/0303918 A1 * | 12/2009 | Ma et al. | 370/315 |
| 2009/0325626 A1 * | 12/2009 | Palanki et al. | 455/522 |
| 2010/0009625 A1 * | 1/2010 | Chami et al. | 455/11.1 |
| 2010/0020757 A1 * | 1/2010 | Walton et al. | 370/329 |
| 2010/0035600 A1 | 2/2010 | Hou et al. | |
| 2010/0265842 A1 * | 10/2010 | Khandekar et al. | 370/252 |
| 2011/0026630 A1 * | 2/2011 | Stager et al. | 375/267 |
| 2011/0034175 A1 * | 2/2011 | Fong et al. | 455/450 |
| 2011/0189999 A1 | 8/2011 | Mueck | |
| 2011/0222434 A1 | 9/2011 | Chen | |
| 2011/0223958 A1 * | 9/2011 | Chen et al. | 455/522 |
| 2011/0223960 A1 | 9/2011 | Chen et al. | |
| 2011/0223961 A1 | 9/2011 | Chen | |
| 2011/0244914 A1 | 10/2011 | Venkatraman et al. | |
| 2012/0069882 A1 | 3/2012 | Nino et al. | |
| 2012/0163179 A1 | 6/2012 | Jo et al. | |
| 2012/0214550 A1 | 8/2012 | Galaro et al. | |
| 2012/0220214 A1 | 8/2012 | Du et al. | |
| 2012/0309349 A1 | 12/2012 | Schmidt et al. | |
| 2013/0058390 A1 * | 3/2013 | Haas et al. | 375/224 |
| 2013/0150046 A1 | 6/2013 | Gogic et al. | |

FOREIGN PATENT DOCUMENTS

| | | |
|---|---|---|
| CN | 101321007 A | 12/2008 |
| CN | 101483456 A | 7/2009 |
| JP | H09-232848 | 9/1997 |
| JP | 2004260446 | 9/2004 |
| JP | 2004357325 | 12/2004 |
| JP | 2007-533178 | 11/2007 |
| JP | 2009-290406 | 12/2009 |
| JP | 2011-524117 | 8/2011 |
| WO | WO 2005/099121 | 10/2005 |
| WO | WO 2008/146394 | 12/2008 |
| WO | WO 2009/088328 | 7/2009 |
| WO | WO 2009/143176 | 11/2009 |

OTHER PUBLICATIONS

Chen, U.S. Appl. No. 13/020,640, U.S. Non-final Office Action, Jul. 11, 2013.

KIPO's Notice of Preliminary Rejection for Korean Patent Application No. 10-2012-7023612 (English translation included), Jan. 23, 2014.

Siavash M. Alamouti, "A Simple Transmit Diversity Technique for Wireless Communications," *IEEE Journal on Select Areas in Communications*, vol. 16, No. 8, Oct. 1998.

Liang Sun et al., "Analytical Performance of MIMO Multichannel Beamforming in the Presence of Unequal Power Cochannel Interference and Noise," *IEEE Transactions on Signal Processing*, vol. 57, No. 7, Jul. 2009.

Shidong Zhou et al., "Distributed Wireless Communication System: A New Architecture for Future Public Wireless Access," *IEEE Communications Magazine*, Mar. 2003.

Wei Feng et al., "Downlink Capacity of Distributed Antenna Systems in a Multi-Cell Environment," © 2009 IEEE.

Wan Choi, et al., "Downlink Performance and Capacity of Distributed Antenna Systems in a Multicell Environment," *IEEE Transactions on Wireless Communications*, vol. 6, No. 1, Jan. 2007.

David Tse et al., "Fundamentals of Wireless Communications," Aug. 13, 2004.

Daniel Perez Palomar et al., "Joint Tx-Rx Beamforming Design for Multicarrier MIMO Channels: A Unified Framework for Convex Optimization," *IEEE Transactions on Signal Processing*, vol. 51, No. 9, Sep. 2003.

Yue Rong et al., "Space-Time Power Schedule for Distributed MIMO Links without Instantaneous Channel State Information at the Transmitting Nodes," *IEEE Transactions on Signal Processing*, vol. 56, No. 2, Feb. 2008.

3GPP TR 36.942 V9.2.0 (Dec. 2009) 3rd Generation Partnership Project; Technical Specification Group Radio Access Network; Evolved Universal Terrestrial Radio Access (E-UTRA); Radio Frequency (RF) System Scenarios; (Release 9).

3GPP TR 36.300 V9.2.0 (Dec. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

CPRI Specification V4.1 (Feb. 18, 2009), Common Public Radio Interface (CPRI); Interface Specification.

Gerry Leavey, PMC-Sierra, "Enabling Distributed Base Station Architectures with CPRI," Issue No. 1, Feb. 2006.

"Distributed Antenna System," from Wikipedia, the free encyclopedia, downloaded from http://en.wikipedia.org/wiki/Distributed_Antenna_System, on Sep. 17, 2010

Wei-Peng Chen, "System and Method for Implementing Power Distribution," U.S. Appl. No. 12/879,884, filed Sep. 10, 2010.

(56) References Cited

OTHER PUBLICATIONS

Wei-Peng Chen, "System and Method for Implementing Power Distribution," U.S. Appl. No. 12/884,377, filed Sep. 17, 2010.
PCT Notification of Transmittal of the International Search Report and the Written Opinion of the International Searching Authority, or the Declaration mailed Oct. 18, 2011 regarding PCT/US2011/031666.
PCT Invitation to Pay Additional Fees and, Where Applicable, Protest Fee, mailed Jul. 14, 2011 regarding PCT/US2011/031666.
Chen, U.S. Appl. No. 12/879,884, U.S. Non=final Office Action, Aug. 12, 2013.
PCT Notification of Transmittal of the International Search Report and the Written Opinion of the International Searching Authority, or the Declaration mailed May 31, 2011 re PCT/US2011/026405 filed Feb. 28, 2011.
PCT Notification of Transmittal of the International Search Report and the Written Opinion of the International Searching Authority, or the Declaration mailed Jun. 7, 2011 re PCT/US2011/027332 filed Mar. 7, 2011.
PCT Notification of Transmittal of the International Search Report and the Written Opinion of the International Searching Authority, or the Declaration mailed Jun. 7, 2011 re PCT/US2011/027331 filed Mar. 7, 2011.
Chen et al., U.S. Appl. No. 13/020,640, filed Feb. 3, 2011, "Method and Apparatus for Deploying a Wireless Network" patent application.
Office Action Summary issued by the USPTO for U.S. Appl. No. 12/879,884, filed Sep. 10, 2010 for Wei-Peng Chen, Jan. 27, 2014.
Korean Intellectual Property Office Notice of Preliminary Rejection for Korean Patent Application No. 10-2012-7026379, Oct. 30, 2013.
Notice of Allowance and Fee(s) Due issued by the USPTO for U.S. Appl. No. 13/020,640, filed Feb. 3, 2011, Mar. 14, 2014.
Notification of Reasons for Refusal for Japanese Patent Application No. 2011-051833 (includes English translation), mailing date Jun. 10, 2014.
Notification of the First Office Action issued by the State Intellectual Property Office of People's Republic of China for Application No. or Patent No. 201180013026.4, Apr. 30, 2014.
Office Action Summary issued by the USPTO for U.S. Appl. No. 12/956,710 for Inventor: Wei-Peng Chen, May 7, 2014.
Wei-Peng Chen, U.S. Appl. No. 12/879,884, Non-final Office Action dated Oct. 20, 2014.
State Intellectual Property Office of PRC, Notification of the Second Office Action, Appln. 201180013026.4 dated Nov. 18, 2014 (English and Chinese versions)(25 pages).
State Intellectual Property Office of PRC, Notification of the First Office Action, Appln. 201180012628.8 dated Aug. 15, 2014.
Wei-Peng Chen, U.S. Appl. No. 12/879,884, Final Office Action dated Jul. 2, 2014.
Wei-Peng Chen, U.S. Appl. No. 12/956,710, Final Office Action dated Aug. 26, 2014.
Wei-Peng Chen, U.S. Appl. No. 12/956,710, Advisory Action dated Nov. 10, 2014.
Wei-Peng Chen, U.S. Appl. No. 12/956,710, Advisory Action dated Dec. 4, 2014.
Wei-Peng Chen, U.S. Appl. No. 12/956,710,Non-Final Office Action dated Jan. 13, 2015.
Japanese Patent Office, Japanese Patent Application No. 2011-051833, Office Action regarding Decision to Refuse mailing date Feb. 3, 2015.

\* cited by examiner

SYSTEM AND METHOD FOR IMPLEMENTING POWER DISTRIBUTION

RELATED APPLICATION

This application claims the benefit under 35 U.S.C. §119(e) of U.S. Provisional Application Ser. No. 61/312,415, filed Mar. 10, 2010 and entitled "Method and System for Enhancing Capability of Distributed Antenna System."

TECHNICAL FIELD OF THE INVENTION

This invention relates in general to wireless networks and, more particularly, to a system and method for implementing power distribution.

BACKGROUND OF THE INVENTION

Distributed antenna systems consist of a base station (also known as a Radio Element Control or a Baseband Unit) and one or more remote transceivers (also known as Radio Elements or Remote Radio Heads). These components provide endpoints with wireless network access. To aid the distributed antenna system in distinguishing between the various wireless transmissions to and from the various endpoints, each endpoint may have one or more unique subcarriers assigned thereto.

Within a distributed antenna system, the remote transceivers are distributed around different locations while being connected via a wired connection (e.g., optical fiber) to the base station. Wile there may be multiple remote transceivers, from the perspective of an endpoint there is only one entity, the base station. That is, each remote transceiver transmits essentially the same core data, and the endpoint combines multiple signals from multiple remote transceivers into a single communication.

The base station communicates with the remote transceivers using, for example, the Common Public Radio Interface (CPRI) standard. The CPRI standard allows in-phase/quadrature (I/Q) data to be transmitted from the base station to the remote transceivers. The remote transceivers use the I/Q data to form the transmissions that are sent to any endpoints connected thereto. The remote transceivers are also able to communicate with the base station using the CPRI standard. This allows the remote transceivers to relay data received from the endpoints and to communicate control information, such as signal quality, to the base station.

SUMMARY

In accordance with a particular embodiment, a method for adjusting power distribution that includes establishing a connection between a base station and a plurality of remote transceivers. The method also includes establishing a plurality of wireless connections with a plurality of endpoints via one or more of the plurality of remote transceivers. The method further includes receiving a signal quality indication from each of the plurality of remote transceivers for any endpoint for which the remote transceiver is able to receive a wireless communication. The method additionally includes determining a power distribution for the plurality of remote transceivers based on the received signal quality indication from each of the remote transceivers. The method also includes transmitting a control signal to the plurality of remote transceivers. The control signal comprises the power distribution and is indicative of the amount of power each remote transceiver is to use for each endpoint when transmitting wireless communications.

Technical advantages of particular embodiments may include providing power distribution to multiple remote transceivers using a relatively low CPRI link rate. Another technical advantage of particular embodiments includes increasing the uplink and downlink capacity of a distributed antennae system. Yet another technical advantage or certain embodiments is that remote transceiver specific reference signals may not be applied at different remote transceivers—the same reference signal is sent by all remote transceivers (e.g., the endpoints see all the remote transceivers as a single base station). Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
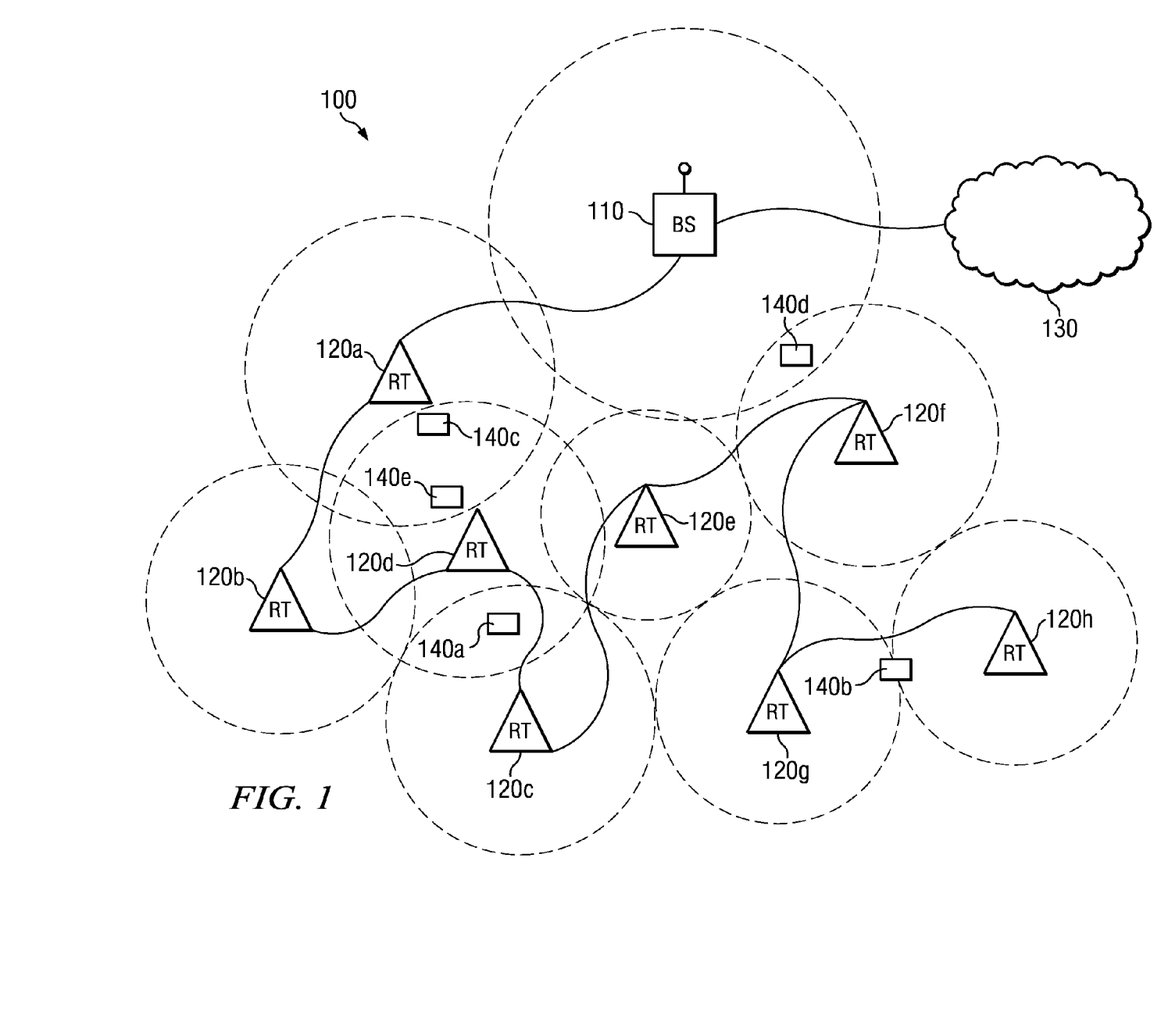
FIG. 1 illustrates a distributed antenna system comprising a base station and a plurality of remote transceivers, in accordance with a particular embodiment.

FIG. 1 illustrates a distributed antenna system comprising a base station and a plurality of remote transceivers, in accordance with a particular embodiment. Distributed antenna system 100 comprises base station 110 and multiple remote transceivers 120. Wireless communications may be transmitted by remote transceivers 120 at varying power levels. The power of a particular transmission, comprising one or more subcarriers, from a particular remote transceiver (e.g., remote transceiver 120d) to a particular endpoint (e.g., endpoint 140c) may depend on the signal quality between the particular endpoint and the particular remote transceiver. The transmission power of each subcarrier at each remote transceiver may be greater than or less than a standard power level. The standard power level may be based on an equal distribution of power among the subcarriers (e.g., all transmissions are transmitted with the same power). Increasing or decreasing the transmission power for each endpoint 140 at each remote transceiver 120 may increase the capacity of distributed antenna system 100 as compared to a system utilizing uniform power across all subcarriers.

Distributed antenna system 100 may be coupled to network 130 via base station 110. Distributed antenna system 100 provides wireless coverage for endpoints 140 over a large geographic area. For example, a single base station (e.g., base station 110) and a plurality of remote transceivers (e.g., remote transceivers 120) may be used to provide wireless coverage for an entire building. Because remote transceivers 120 are distributed over a geographical area, the distance between an endpoint and each remote transceiver 120 may be different. In particular embodiments, the signal quality between an endpoint and a remote transceiver may generally increase as the endpoint gets closer to the remote transceiver.

Particular embodiments may take advantage of this increased signal quality by increasing the transmission power for the subcarriers associated with the signal having the better quality. Because a remote transceiver has a finite amount of transmission power, an increase in power for a particular subcarrier may be balanced by a corresponding decrease in power of another subcarrier.

Depending on the embodiment, distributed antenna system 100 may use any of a variety of wireless technologies or protocols (e.g., IEEE 802.16m or 802.16e, or long term evolution (LTE)) for communications between remote transceivers 120 and endpoints 140. The multiple remote transceivers 120 appear to endpoints 140 as a single entity—an extension of base station 110. Thus, each remote transceiver 120 may attempt to send the same core data to endpoints 140 and may potentially receive the same data from endpoints 140. The differences in the data that is sent or received may be the result of the respective distances of each remote transceiver 120 from a particular endpoint and, as will be discussed in more detail below, the amount of power applied to each subcarrier at each remote transceiver.

Depending on the embodiment, distributed antenna system 100 may use any of a variety of different wired technologies or protocols (e.g., CPRI) for communications between remote transceivers 120 and base station 110. In particular embodiments, base station 110 may be configured to adjust the power, either directly (e.g., incorporating the power distribution in the I/Q samples that are sent to the remote transceivers) or indirectly (e.g., providing power distribution values to each remote transceiver from which the remote transceivers can determine their respective power distribution), that each remote transceiver applies to its transmissions. By selectively increasing or decreasing the transmission power for particular sub-carriers (associated with particular endpoints) at particular remote transceivers, base station 110 may be able to more efficiently use the available wireless resources.

Depending on the embodiment, base station 110 may use signal quality information from the various remote transceivers to determine the power distribution for each sub-carrier for each remote transceiver 120. The signal quality information may include the received uplink power strength, the maximal usable modulation and coding scheme (MCS) level, the Carrier to Interference-plus-Noise Ratio (CINR) of the wireless connection. In particular embodiments, uplink sounding may be used to estimate the channel gain and interference strength between endpoints 140 and remote transceivers 120.

Network 130 may be any network or combination of networks capable of transmitting signals, data, and/or messages, including signals, data or messages transmitted through WebPages, e-mail, text chat, voice over IP (VoIP), and instant messaging. Network 130 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

Base station 110 may include any combination of hardware, software embedded in a computer readable medium, and/or encoded logic incorporated in hardware or otherwise stored (e.g., firmware) to implement any number of communication protocols that allow for the wireless exchange of packets in distributed antenna system 100. Base station 110 may be configured to determine and distribute a power distribution to each remote transceiver 120. Depending on the embodiment, base station 110 may apply the power distribution to the data before it is sent to the remote transceivers for transmission or base station 110 may send the power distribution to each remote transceiver to allow them to each individually apply the power distribution.

Remote transceivers 120 may include any combination of hardware, software embedded in a computer readable medium, and/or encoded logic incorporated in hardware or otherwise stored (e.g., firmware) to implement any number of communication protocols that allow for the wireless exchange of packets with endpoints 140 in distributed antenna system 100. In some embodiments, remote transceivers 120 receive data from base station 110 that may already include the power distribution determinations made by base station 110. In particular embodiments, each remote transceiver 120 may adjust the transmission power of the core data received from base station 110. In such an embodiment, each remote transceiver 120 receives the same core data and one or more control signals sent from base station 110 specifying the transmission power for each sub-carrier, or plurality of subcarriers, at each respective remote transceiver 120. Remote transceivers 120 may then apply the power distribution to the core data before sending communications to endpoints 140.

Endpoints 140 may comprise any type of wireless device able to send and receive data and/or signals to and from base station 110 via remote transceivers 120. Some possible types of endpoints 140 may include desktop computers, PDAs, cell phones, smart phones, laptops, and/or VoIP phones. Endpoints 140 may provide data or network services to a user through any combination of hardware, software embedded in a computer readable medium, and/or encoded logic incorporated in hardware or otherwise stored (e.g., firmware). Endpoints 140 may also include unattended or automated systems, gateways, other intermediate components or other devices that can send or receive data and/or signals.

The following example may help illustrate particular features of certain embodiments. For purposes of this example, assume that base station 110 only controls two remote transceivers, remote transceivers 120a and 120d. Further assume that endpoints 140c and 140e are both located in the area served by remote transceivers 120a and 120d. To simplify the scenario, assume that the scheduling algorithm at base station 110 allocates the same number of subcarriers in a frame to each of endpoints 140c and 140e. Further assume that the magnitude of the channel gain between remote transceiver 120a and endpoint 140c is twice that of remote transceiver 120a and endpoint 140e; and that the magnitude of the channel gain between remote transceiver 120d and endpoint 140e is twice that of remote transceiver 120d and endpoint 140c. Then, based on these assumptions, base station 110 may allocate ⅔ of remote transceiver 120a's power to the subcarriers used by endpoint 140c and ⅓ to the subcarriers used by endpoint 140e (as opposed to the even ½ and ½ distribution of a standard distributed antenna system). Similarly, base station 110 may allocate ⅔ of remote transceiver 120d's power to the subcarriers used by endpoint 140c and ⅓ to the subcarriers used by endpoint 140e.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 2:
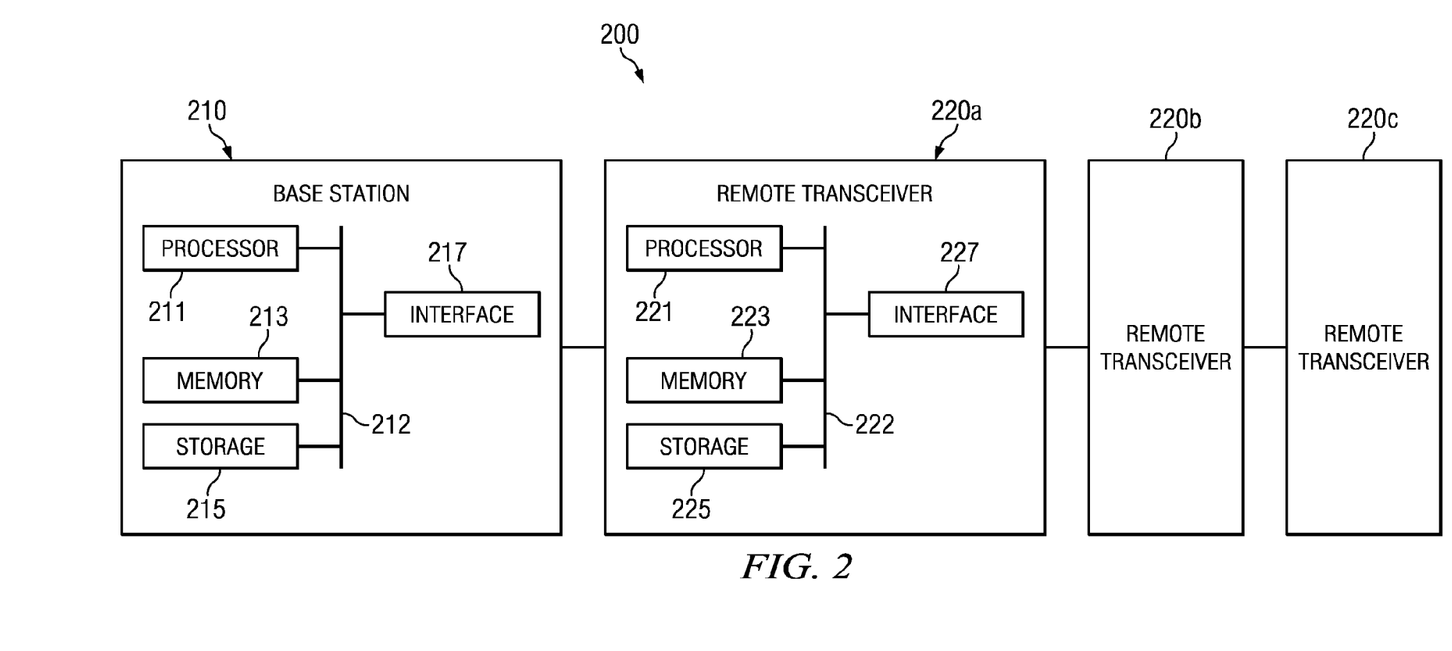
FIG. 2 illustrates a detailed block diagram of a base station and a remote transceiver within a distributed antenna system, in accordance with a particular embodiment.

FIG. 2 illustrates a detailed block diagram of a base station and a remote transceiver within a distributed antenna system, in accordance with a particular embodiment. Distributed antenna system 200 may be used with any of a variety of different wireless technologies, including, but not limited to, orthogonal frequency division multiple access (OFDMA), next generation wireless systems such as LTE-A and 802.16m.

Distributed antenna system 200 includes base station 210 and remote transceivers 220. Base station 210 and remote transceivers 220 may each include one or more portions of one or more computer systems. In particular embodiments, one or more of these computer systems may perform one or more steps of one or more methods embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 210 and remote transceiver 220 may comprise any suitable physical form, configuration, number, type and/or layout. As an example, and not by way of limitation, base station 210 and/or remote transceiver 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 210 and/or remote transceiver 220 may include one or more computer systems; be unitary or distributed; span multiple locations; span multiple machines; or reside in a cloud, which may include one or more cloud components in one or more networks.

Where appropriate, distributed antenna system 200 may perform without substantial spatial or temporal limitation one or more steps of one or more methods described or illustrated herein. As an example, and not by way of limitation, distributed antenna system 200 may perform in real time or in batch mode one or more steps of one or more methods described or illustrated herein. One or more distributed antenna systems may perform at different times or at different locations one or more steps of one or more methods described or illustrated herein, where appropriate.

In the depicted embodiment, base station 210 and remote transceiver 220 each include their own respective processors 211 and 221, memory 213 and 223, storage 215 and 225, interfaces 217 and 227, and buses 212 and 222. These components may work together to provide a distributed antenna system in which the power distribution for each endpoint at each remote transceiver 220 is distributed based on a relative signal quality for each endpoint at each remote transceiver. Although a particular distributed antenna system is depicted having a particular number of particular components in a particular arrangement, this disclosure contemplates any suitable distributed antenna system 200 having any suitable number of any suitable components in any suitable arrangement. For simplicity, similar components of base station 210 and remote transceiver 220 will be discussed together wherein the components of remote transceiver 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controllers, or any other suitable computing devices, resources, or combinations of hardware, software and/or encoded logic operable to provide, either alone or in conjunction with other components, (e.g., memory 213 or 223, respectively) wireless networking functionality. Such functionality may include providing various wireless features discussed herein. For example, processor 211 may determine how to allocate power for each sub-carrier at each remote transceiver 220. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. Memory 213 (and/or 223) may store any suitable data or information utilized by base station 210 (and/or remote transceiver 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. As an example and not by way of limitation, base station 210 may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

Bus 212 (and/or 222) may include any combination of hardware, software embedded in a computer readable medium, and/or encoded logic incorporated in hardware or otherwise stored (e.g., firmware) to couple components of base station 210 (and/or remote transceiver 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses, as described below. In particular embodiments, one or more memory management units (MMUs) may reside between processor 211 (and/or 221) and memory 213 (and/or 223) and facilitate accesses to memory 213 (and/or 223) requested by processor 211 (and/or 221). In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate.

In particular embodiments, storage 215 (and/or 225) may include mass storage for data or instructions. As an example and not by way of limitation, storage 215 (and/or 225) may include an HDD, a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to base station 210 (and/or remote transceiver 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between base station 210, remote transceivers 220, any endpoints (not depicted) being serviced by base station 210, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such an embodiment, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. The power distribution for the radio signal may have been determined and applied to each subcarrier at base station 210, or the power distribution may be determined at base station 210 and applied by remote transceivers 220. Similarly, the radios may convert radio signals received via the antenna into digital data to be processed by, for example, processor 211 (and/or 221). In some embodiments, base station 210 may process the data by: Applying MRC to the individual incoming I/Q samples from each remote transceiver 220; determining the average received power of each subcarrier at each remote transceiver 220; allocating transmission power to each subcarrier for each remote transceiver 220; and perform power amplification and inverse fast Fourier transform on the data to be sent to the endpoints. In some embodiments, processing the data may comprise, at remote transceivers 220, determining the average received power for each subcarrier and combining the data from the endpoint with data from the same endpoint provided by an upstream remote transceiver. Then, at base station 210, a power distribution is determined for each subcarrier for each remote transceiver 220.

Depending on the embodiment, interface 217 (and/or 227) may be any type of interface suitable for any type of network for which distributed antenna system 200 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 (and/or remote transceivers 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and base station 210 (and/or remote transceivers 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more device or encoded software drivers enabling processor 211 (and/or 221) to drive one or more of these I/O devices. Interface 117 (and/or 227) may include one or more interfaces 117 (and/or 227), where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The components and devices illustrated in FIG. 2 form distributed antenna system 200. From the perspective of an endpoint, distributed antenna system 200 may be perceived as a single base station. An endpoint may be unable to distinguish between a wireless transmission sent by a remote transceiver and a wireless transmission sent by a base station. The channel experienced by an endpoint is the sum of the channel responses from each of remote transceivers 220.

In particular embodiments, base station 210 may communicate with remote transceivers 220 using Common Public Radio Interface (CPRI). The CPRI specification supports a variety of topologies, including ring, tree, star, and chain topologies. Regardless of the topology, CPRI allows multiple remote transceivers 220 to be controlled by the same base station 210. In some embodiments, the CPRI link may be used by base station 210 to send/receive different in-phase/quadrature (I/Q) data to/from each different remote transceivers 220. For example, in some embodiments base station 210 may apply power distribution locally to data before it is sent out to the remote transceivers. This may result in each remote transceiver needing its own unique I/Q sample. In particular embodiments, the CPRI link may be used to send/receive a single set of I/Q samples from remote transceivers 220. For example, in some embodiments the power distribution may be applied individually at each respective remote transceiver. This may allow a single I/Q sample to be used by all remote transceivers 220.

The allocation of power to different subcarriers at different remote transceivers 220 in the power distribution may be based on channel response information associated with each endpoint at each remote transceiver 220. In particular embodiments, base station 210 may allocate more power to those endpoints having better channel quality at each respective remote transceiver.

Depending on the embodiment, there may be at least three components used to determine channel response: path loss, shadowing, and multipath. In contrast with shadowing and multipath effects (which are often random processes) path loss is the most dominant component in the channel response. Path loss may be a function of the distance between an endpoint and a remote transceiver. The closer an endpoint is to a particular remote transceiver, the higher the channel gain is between the endpoint and the remote transceiver. In distributed antenna system 200, the varying distances between an endpoint and each remote transceiver 220 may result in varying path losses and channel gains between remote transceivers 220 and a particular endpoint.

In particular embodiments, the closer an endpoint is to a remote transceiver, the greater the power that will be allocated to the subcarriers associated with the endpoint. Conversely, the farther an endpoint is from a remote transceiver, the less power that will be allocated to subcarriers associated with the endpoint. This may allow each remote transceiver 220 to more efficiently use their available transmission power. The non-uniform power distribution to different subcarriers could enhance the signal to interference-plus-noise ratio (SINR) at the endpoint by increasing the received signal strength from the closer remote transceivers 220 while the loss of signal strength due to the reduced power from a more distant remote transceiver may be insignificant.

In particular embodiments, each remote transceiver 220 may measure the average received power of the subcarriers allocated to each endpoint. This information may then be delivered to base station 210 over a CPRI control channel. Base station 210 may use the measured uplink power to approximate the downlink channel response between each remote transceiver 220 and the endpoints. This estimation may be used by base station 210 to determine the power distribution which base station 210 may then send to remote transceivers 220 using the CPRI control channel.

In some embodiments, each remote transceiver 220 may send their own respective I/Q data along with I/Q data received from the upstream remote transceiver. Base station 210 may use the individual I/Q samples to estimate the received downlink power at the endpoint (e.g., it may be proportional to the determined uplink power). Using this estimated power, base station 210 may determine and apply an amount of amplification or attenuation to the download signal. This may be done without adjusting the phase of the download signal. The amplified data may then be sent to remote transceivers 220 as individual I/Q data.

In certain embodiments, before base station 210 allocates the power distribution, it first executes a scheduling algorithm to allocate subcarriers within a channel to the different endpoints. Once the subcarriers have been assigned, base station 210 may use the measured uplink power received from remote transceivers 220 to redistribute the downlink power to maximize system capacity. Depending on the embodiment and/or scenario, base station 210 could use any of a variety of strategies to apply power distribution. For example, base station 210 may use a strategy similar to maximum ratio combination (MRC). In this scenario, the allocated downlink power of a subcarrier at a particular remote transceiver (e.g., remote transceiver 220a) is made to be proportional to the uplink channel gain of the same subcarrier measured at the same particular remote transceiver (e.g., remote transceiver 220a). As another example, base station 210 may maximize system capacity by solving an optimization problem, such as:

$$\max \sum_{i=1}^{I} \sum_{u=1}^{N_{UE}} S_u \cdot \ln\left(1 + \frac{\sum_{r=1}^{N_H} \frac{c \cdot P_{r,u}^{UL}}{N_T} \cdot G_{r,u}^i}{\sum_{j=1}^{N_I} \frac{c \cdot P_{j,u}^{UL}}{N_T} \cdot G_{j,u}^i + \sigma_n^2}\right)$$

$$\text{s.t.} \sum_{u=1}^{N_{UE}} G_{r,u}^i \cdot S_u \leq N \ \forall \ i=1,\ldots,I \text{ and } r=1,\ldots,N_H$$

$$G_{r,u}^i \geq 0 \ \forall \ i=1,\ldots,I; \ r=1,\ldots,N_H, \text{ and } u=1,\ldots,N_{UE}$$

In the above optimization formulation: (1) $S_u$ may represent the number of subcarriers allocated to the u-th end point; (2) $G_{r,u}$ ($=g_{r,u}^2$) may represent the square of the common power amplification factor at the r-th remote transceiver for all the subcarriers allocated to the u-th end point; (3) $P_{r,u}^{UL}$ may represent the average of the received uplink power of a subcarrier allocated to the u-th end point at the r-th remote transceiver; (4) c may represent a constant used to calibrate the differences between the transmitting and receiving antenna gains of downlink and uplink connections; (5) $N_T$ may represent the number of the transmitting antennas at each remote transceiver; (6) $N_H$ may represent the number of the remote transceivers controlled by a base station in a cell; (7) $N_{UE}$ may represent the number of end points that are scheduled in one transmission timing interval (TTI); (8) $N_I$ may represent the number of interference base stations; (9) $\sigma_n^2$ may represent the variance of the noise power per subcarrier; (10) N may represent the number of points of FFT (Fast Fourier Transform) in a channel, which may be the same as the number of subcarriers in a channel; and (11) the term of the log function, ln(.) may represent the average estimated per subcarrier capacity at the u-th end point. It may be the case that the symbols in the formulation above represent mostly given parameters, with $G_{r,u}$ (r=1, ..., $N_H$, and u=1, ..., $N_{UE}$) being the variables in the formulation.

The objective function of the above formulation may be to maximize the overall system capacity. The system capacity may be based on the sum of the estimated capacity of all the end points connected to base station 210. The first set of constraint functions may limit the total transmission power at each remote transceiver to be less than or equal to a maximum transmission power, $P_T$. The constraint functions are derived from the following inequality:

$$\Sigma_{k=1}^{N} G_{r,k} \cdot P_{r,k}^{TX} \leq P_T \ \forall r=1, \ldots, N_H$$

Where $P_{r,k}^{TX}$ is the power assigned to the k-th subcarrier of the r-th remote transceiver before the power amplification operation. Because prior to the power amplification operation all the subcarriers have equal power, $P_{r,k}^{TX}$ be presented as $P_T/N$. Moreover, in certain embodiments, the power amplification gains for different subcarriers allocated to the same end point may be set to be the same. This may allow the inequality to be simplified to the constraint functions in the optimization problem. The second set of constraint functions may ensure the positive or zero power amplification gains computed from the optimization problem.

Once base station 210 has determined how to allocate the downlink power for the various subcarriers at each remote transceiver 220, the power distribution may be applied either at base station 210 or at remote transceivers 220. For example, in some embodiments, base station 210 may generate I/Q data for each remote transceiver 220 that includes the power core data modified by the power distribution (this may be done in the frequency domain before base station 210 performs Inverse Discrete Fourier Transform (IDFT) operations). This may scale the data of frequency domain (before IDFT) up or down proportionally such that the total power of each remote transceiver does not exceed its capabilities.

In some embodiments, base station 210 receives a combined uplink signal from remote transceivers 220. For example, remote transceiver 220c may send its received uplink signal to remote transceiver 220b. Remote transceiver 220b may combine its own received uplink signal with the uplink signal from remote transceiver 220c. The combined uplink signal may then be sent to remote transceiver 220a for remote transceiver 220a to combine with its received uplink signal. The combined uplink signal from all three remote transceivers may then be sent to base station 210. Accordingly, base station 210 may only receive one combined uplink I/Q sample and not individual I/Q samples from each remote transceiver 220.

In certain embodiments, base station 210 may enhance uplink capacity via Maximum Ratio Combining (MRC). This may be achieved, in part, by determining the received signal power of the subcarriers allocated to each endpoint. Base station 210 may further use MRC in processing each I/Q data sample sent from each of remote transceivers 220. This may improve the array gain associated with the multiple receiving entities of remote transceivers 220.

In particular embodiments, base station 210 may apply the power distribution to the core data, $g_r(k)=\sqrt{G_r(k)}$, before Inverse Fast Fourier Transform (IFFT) is applied. Both power amplification and IFFT may be done locally at base station 210. This may result in base station 210 sending different I/Q data to each remote transceiver 220. This may increase the data rate of the CPRI link. However, because base station 210 is sending different I/Q data specific for each remote transceiver 220, it may be possible to use standard remote transceivers without having to modify them to be able to make power adjustments based on a power distribution from base station 210. In particular embodiments, the MRC, power amplification determination, FFTs (to process I/Q samples received from remote transceivers) and the IFFTs (to process I/Q samples to be sent to remote transceivers), may be performed by discrete modules designed specifically for each respective task. In some embodiments, one or more of these features may be performed by a combination of one or more of processor 211, memory 213, storage 215, bus 212 and interface 217.

In particular embodiments, each remote transceiver 220 may apply the power distribution and perform IFFT locally. This may allow base station 210 to send the same (frequency-domain) data to each remote transceiver 220. This may reduce the data rate needed for the CPRI link. In certain embodiments, in addition to the frequency domain I/Q data, base station 210 may also send the downlink scheduling information (e.g., the set of subchannels/subcarriers assigned to each endpoint in the transmission time interval (TTI)), and the power distribution for each endpoint. In particular embodiments, both pieces of information may be carried over the CPRI control session or CPRI control channel. The amount of data for both power amplification gain and scheduling information is much less compared to I/Q data.

In particular embodiments, each remote transceiver 220 may combine its own I/Q data with the I/Q data it receives from an upstream remote transceiver 220. The combined I/Q data may then be passed to the next remote transceiver downstream (towards base station 210). Because base station 210 receives only a single set of I/Q data based on the combination of the I/Q data from each of remote transceivers 220, base station 210 may not be able to use the received I/Q data to determine the power amplification distribution. However, in certain embodiments, remote transceivers 220 may compute the average received power from particular endpoints and send this information to base station 210 via a CPRI control signal. In some embodiments, computing the received power from an endpoint may include using scheduling information from base station 210. In particular embodiments, FFT operations may be performed at each remote transceiver 220 thereby relieving base station 210 of the task of performing FFT. In some embodiments, remote transceivers 220 may compute the average received power after FFT is conducted. In particular embodiments, remote transceivers 220 may comprise one or more discrete hardware modules for computing the average received power and/or performing the FFT. In particular embodiments, these tasks may be performed by a combination of processor 221, memory 223, storage 225 and/or interface 227.

Thus far, several different embodiments and features have been presented. Particular embodiments may combine one or more of these features depending on operational needs and/or component limitations. This may allow for great adaptability of distributed antenna system 200 to the needs of various organizations and users. Some embodiments may include additional features.

Figure 3:
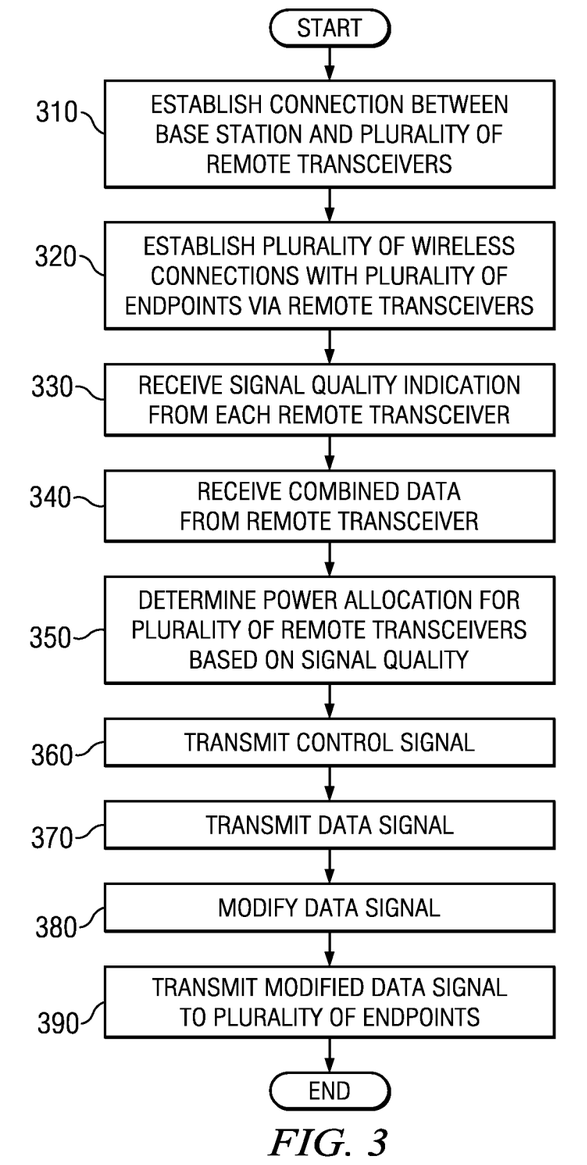
FIG. 3 illustrates a method for implementing power distribution, in accordance with a particular embodiment.

FIG. 3 illustrates a method for implementing power distribution, in accordance with a particular embodiment. The method begins at step 310 where a connection between a base station and a plurality of remote transceivers is established. In some embodiments, the connection between the base station and the plurality of remote transceivers may comprise a Common Public Radio Interface connection. In particular embodiments, the plurality of remote transceivers may be arranged in a cascaded topology. The cascaded topology may allow data and/or communications to be relayed end-to-end by passing through each of the remote transceivers. In other embodiments, the plurality of remote transceivers may be arranged in a star, tree, or ring topology. Regardless of the configuration, the base station may be responsible for managing one or more parameters and/or data associated with each of the remote transceivers.

At step 320 a plurality of wireless connections are established with a plurality of endpoints. The wireless connections are established via one or more of the plurality of remote transceivers. While each endpoint, from its perspective, may have established a single wireless connection with a single base station, each endpoint may actually be sending and receiving communications from a number of remote transceivers. When an endpoint receives multiple wireless signals from multiple remote transceivers, it may perform various techniques for deriving the core data from the multiple wireless signals. For example, in some embodiments an endpoint may combine two or more wireless signals from two or more remote transceivers (each wireless signal comprises a copy of the same core data).

At step 330 a signal quality indication is received from each of the plurality of remote transceivers. Each signal quality indication may comprise information from which the base station may be able to determine the relative quality, strength, and/or efficiency of a wireless connection between the respective remote transceiver and each endpoint of the plurality of endpoints. For example, if a particular remote transceiver is able to receive a signal from two endpoints, the signal quality indication sent from the particular remote transceiver would include information regarding the relative quality, strength, and/or efficiency of a wireless connection with both of the two endpoints. In some embodiments, each remote transceiver may compute the average received power from each of the plurality of endpoints. This may be sent to the base station as a signal quality indication. In particular embodiments, the signal quality indication may be communicated from the remote transceivers to the base station over a CPRI control channel.

At step 340 the combined data from the remote transceivers is received by the base station. The combined data may comprise a single data set formed from each data set received at each of the respective remote transceivers. In certain embodiments, the combined data may be created through a series of repeating steps in which each remote transceiver receives the combined data from an upstream remote transceiver, combines the received combined data with its own received data, and then sends the new combined data downstream to the next remote transceiver. The first remote transceiver in the chain may simply send its received data to the downstream remote transceiver and the last remote transceiver may send its combined data to the base station. The combined data may be sent over a CPRI data channel. Because only one data set is communicated at a time, the bandwidth requirements for the CPRI data channel may be much less compared to systems in which each remote transceiver sends its own respective data to the base station without combining it with other data sets.

At step 350 a power distribution is determined for the plurality of remote transceivers. The power distribution may be based, at least in part, on the received signal quality indication from each of the remote transceivers. The power distribution determines the amount of amplification each remote transceiver is to apply to each respective sub-carrier when transmitting wireless communications to each of the endpoints. In certain embodiments, the better (e.g., stronger, clearer, more efficient) a wireless signal is between a remote transceiver and an endpoint, the greater the amount of power that will be distributed to the remote transceiver to use in communicating with the endpoint; conversely the worse a wireless signal is, the less power that will be distributed to the remote transceiver to use to communicate with the endpoint. For convenience, the result of applying the power distribution to the core data may be referred to as the modified data.

In certain embodiments, once the base station has made its determination for how each remote transceiver is to allocate power among the plurality of endpoints, the base station may encode the information into a control signal. The control signal may be transmitted at step 360. The control signal may provide each remote transceiver with information indicative of how the remote transceiver is to allocate or distribute power among the plurality of sub-carriers used by the plurality of remote transceivers. In some embodiments the control signal may be sent via a CPRI control channel.

At step 370 the base station transmits a data signal. The same data signal may be sent to each of the remote transceivers. For example, in some embodiments, each of the remote transceivers may receive the same core data to be transmitted to each of the plurality of endpoints. The core data may be sent to the remote transceivers using a CPRI data channel.

At step 380 the data signal may be modified based on the control signal. This may be done individually at each remote transceiver. This may result in each remote transceiver transmitting a different signal. For example, while each remote transceiver may receive the same core data in the data signal, each remote transceiver may receive a different power distribution in the control signal. When the power distribution is applied to modify the data signal, the resulting signal may be different for each remote transceiver. In some embodiments, each remote transceiver may perform its own respective inverse fast Fourier transform to generate the modified data signal. At step 390, the modified data signal is transmitted to the plurality of endpoints.

Some of the steps illustrated in FIG. 3 may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within distributed antenna system 100 such as endpoints, base stations and remote transceivers, these elements may be combined, rearranged or positioned in order to accommodate particular routing architectures or needs. In addition, any of these elements may be provided as separate external components to distributed antenna system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for adjusting power distribution comprising:
establishing a connection between a base station and a plurality of remote transceivers;
establishing a plurality of wireless connections with a plurality of endpoints via one or more of the plurality of remote transceivers;
receiving, from a first remote transceiver of the plurality of remote transceivers, combined in-phase/quadrature (I/Q) data, the combined I/Q data comprising a combination of first I/Q data and second I/Q data, wherein:
the first I/Q data comprises I/Q data received at the first remote transceiver from a first endpoint of the plurality of endpoints; and
the second I/Q data comprises I/Q data received at a second remote transceiver of the plurality of remote transceivers originating from the first endpoint and transmitted from the second remote transceiver to the first remote transceiver;
receiving a signal quality indication from each of the plurality of remote transceivers for any endpoint for which the remote transceiver is able to receive a wireless communication;
wherein the signal quality indications are determined based on a measured uplink power received at each of the remote transceivers from the endpoints for which the remote transceiver is able to receive a wireless communication;
determining a power distribution for the plurality of remote transceivers based on the received signal quality indications from each of the remote transceivers; and
transmitting a control signal to the plurality of remote transceivers, the control signal comprising the power distribution and indicative of the amount of power each remote transceiver is to use for each endpoint when transmitting wireless communications.

2. The method of claim 1, wherein establishing the connection between the base station and the plurality of remote transceivers comprises establishing a Common Public Radio Interface connection between the base station and the plurality of remote transceivers.

3. The method of claim 1, further comprising transmitting a data signal to each of the plurality of remote transceivers, each remote transceiver receiving the same data signal.

4. The method of claim 1, wherein determining the power distribution comprises increasing the power distribution for wireless connections having a better relative signal quality indication and decreasing the power distribution for wireless connections having a worse relative signal quality indication.

5. A method for adjusting power distribution comprising:
establishing a connection between a base station and a remote transceiver, the remote transceiver being one of a plurality of remote transceivers connected to the base station;
establishing a plurality of wireless connections with a plurality of endpoints via the remote transceiver;
receiving a communication from at least one endpoint of the plurality of endpoints, the communication comprising first in-phase/quadrature (I/Q) data;
determining at least one signal quality indication associated with the communication from the at least one endpoint;
wherein the determining at least one signal quality indication is based on a measured uplink power received from the at least one endpoint;
receiving second I/Q data from at least one of the plurality of remote transceivers, the second I/Q data originating from the at least one endpoint;
combining the first I/Q data and the second I/Q data to generate combined I/Q data;
transmitting the combined I/Q data and the at least one signal quality indication to the base station;
receiving a control signal from the base station, the control signal comprising a power distribution indicative of the amount of power the remote transceiver is to use for each endpoint of the plurality of endpoints when transmitting wireless communications;
receiving transmit data comprising data to be transmitted to the plurality of endpoints;
modifying the transmit data based on the power distribution; and
transmitting the modified data to the plurality of endpoints.

6. The method of claim 5, wherein:
receiving a control signal from the base station comprises receiving a common public radio interface (CPRI) control signal from the base station over a CPRI control channel; and
receiving transmit data comprises receiving in-phase/quadrature (I/Q) data from the base station.

7. One or more computer-readable non-transitory storage media embodying software that when executed by a processor is operable to:
establish a connection between a base station and a plurality of remote transceivers;
establish a plurality of wireless connections with a plurality of endpoints via one or more of the plurality of remote transceivers;
receive, from a first remote transceiver of the plurality of remote transceivers, combined in-phase/quadrature (I/Q) data, the combined I/Q data comprising a combination of first I/Q data and second I/Q data, wherein:
the first I/Q data comprises I/Q data received at the first remote transceiver from a first endpoint of the plurality of endpoints; and
the second I/Q data comprises I/Q data received at a second remote transceiver of the plurality of remote transceivers originating from the first endpoint and transmitted from the second remote transceiver to the first remote transceiver;
receive a signal quality indication from each of the plurality of remote transceivers for any endpoint for which the remote transceiver is able to receive a wireless communication;
wherein the signal quality indications are determined based on a measured uplink power received at each of the remote transceivers from the endpoints for which the remote transceiver is able to receive a wireless communication;
determine a power distribution for the plurality of remote transceivers based on the received signal quality indications from each of the remote transceivers; and
transmit a control signal to the plurality of remote transceivers, the control signal comprising the power distribution and indicative of the amount of power each remote transceiver is to use for each endpoint when transmitting wireless communications.

8. The media of claim 7, wherein the software that when executed is operable to establish the connection between the base station and the plurality of remote transceivers comprises software that when executed is operable to establish a Common Public Radio Interface connection between the base station and the plurality of remote transceivers.

9. The media of claim 7, wherein the software is further operable to transmit a data signal to each of the plurality of remote transceivers, each remote transceiver receiving the same data signal.

10. The media of claim 7, wherein the software that when executed is operable to determine the power distribution comprises software that when executed is operable to increase the power distribution for wireless connections having a better relative signal quality indication and decrease the power distribution for wireless connections having a worse relative signal quality indication.

11. One or more computer-readable non-transitory storage media embodying software that when executed by a processor is operable to:
establish a connection between a base station and a remote transceiver, the remote transceiver being one of a plurality of remote transceivers connected to the base station;
establish a plurality of wireless connections with a plurality of endpoints via the remote transceiver;
receive a communication from at least one endpoint of the plurality of endpoints, the communication comprising first in-phase/quadrature (I/Q) data;
determine at least one signal quality indication associated with the communication from the at least one endpoint;
wherein the determining at least one signal quality indication is based on a measured uplink power received from the at least one endpoint;
receive second I/Q data from at least one of the plurality of remote transceivers, the second I/Q data originating from the at least one endpoint;
combine the first I/Q data and the second I/Q data to generate combined I/Q data;
transmit the combined I/Q data and the at least one signal quality indication to the base station;
receive a control signal from the base station, the control signal comprising a power distribution indicative of the amount of power the remote transceiver is to use for each endpoint of the plurality of endpoints when transmitting wireless communications;
receive transmit data comprising data to be transmitted to the plurality of endpoints;
modify the transmit data based on the power distribution; and
transmit the modified data to the plurality of endpoints.

12. The media of claim 11, wherein the software that when executed is operable to:
receive a control signal from the base station comprises software that when executed is operable to receive a common public radio interface (CPRI) control signal from the base station over a CPRI control channel; and receive transmit data comprises software that when executed is operable to receive in-phase/quadrature (I/Q) data from the base station.

13. A system for adjusting power distribution comprising:
an interface configured to:
establish a connection between a base station and a plurality of remote transceivers;
establish a plurality of wireless connections with a plurality of endpoints via one or more of the plurality of remote transceivers; and
receive, from a first remote transceiver of the plurality of remote transceivers, combined in-phase/quadrature (I/Q) data, the combined I/Q data comprising a combination of first I/Q data and second I/Q data, wherein:
the first I/Q data comprises data received at the first remote transceiver from a first endpoint of the plurality of endpoints; and
the second I/Q data comprises data received at a second remote transceiver of the plurality of remote transceivers originating from the first endpoint and transmitted from the second remote transceiver to the first remote transceiver;
receive a signal quality indication from each of the plurality of remote transceivers for any endpoint for which the remote transceiver is able to receive a wireless communication;
wherein the signal quality indications are determined based on a measured uplink power received at each of the remote transceivers from the endpoints for which the remote transceiver is able to receive a wireless communication; and
a processor coupled to the interface and configured to determine a power distribution for the plurality of remote transceivers based on the received signal quality indications from each of the remote transceivers; and
wherein the interface is further configured to transmit a control signal to the plurality of remote transceivers, the control signal comprising the power distribution and indicative of the amount of power each remote transceiver is to use for each endpoint when transmitting wireless communications.

14. The system of claim 13, wherein the interface configured to establish the connection between the base station and the plurality of remote transceivers is further configured to establish the connection via a Common Public Radio Interface connection between the base station and the plurality of remote transceivers.

15. The system of claim 13, wherein the interface is further configured to transmit a data signal to each of the plurality of remote transceivers, each remote transceiver receiving the same data signal.

16. The system of claim 13, wherein the processor configured to determine the power distribution is further configured to increase the power distribution for wireless connections having a better relative signal quality indication and decrease the power distribution for wireless connections having a worse relative signal quality indication.

17. A system for adjusting power distribution comprising:
an interface configured to:
establish a connection between a base station and a remote transceiver, the remote transceiver being one of a plurality of remote transceivers connected to the base station;
establish a plurality of wireless connections with a plurality of endpoints via the remote transceiver;
receive a communication from at least one endpoint of the plurality of endpoints, the communication comprising first in-phase/quadrature (I/Q) data; and
receive second I/Q data from at least one of the plurality of remote transceivers, the second I/Q data originating from the at least one endpoint;
a processor coupled to the interface and configured to:
determine at least one signal quality indication associated with the communication from the at least one endpoint;
wherein the determining at least one signal quality indication is based on a measured uplink power received from the at least one endpoint; and
combine the first I/Q data and the second I/Q data to generate combined I/Q data;
wherein the interface is further configured to:
transmit the combined I/Q data and the at least one signal quality indication to the base station;
receive a control signal from the base station, the control signal comprising a power distribution indicative of the amount of power the remote transceiver is to use for each endpoint of the plurality of endpoints when transmitting wireless communications; and
receive transmit data comprising data to be transmitted to the plurality of endpoints;
wherein the processor is further configured to:
modify the transmit data based on the power distribution; and
wherein the interface is further configured to transmit the modified data to the plurality of endpoints.

18. The system of claim 17, wherein:
the interface configured to receive a control signal from the base station is further configured to receive a common public radio interface (CPRI) control signal from the base station over a CPRI control channel; and
the interface configured to receive transmit data is further configured to receive in-phase/quadrature (I/Q) data from the base station.

* * * * *